Sept. 8, 1970        L. BLUM ET AL        3,527,443

HANDRAIL POST FITTING

Original Filed June 18, 1968

INVENTORS.
Louis Blum
William J. Horgan, Jr.

BY

*Paul & Paul*

ATTORNEYS.

3,527,443
Patented Sept. 8, 1970

3,527,443
HANDRAIL POST FITTING

Louis Blum, 1297 Folkstone Drive 15243, and William J. Horgan, Jr., 15 Darlington Court 15217, both of Pittsburgh, Pa.
Original application June 18, 1968, Ser. No. 738,025. Divided and this application Jan. 16, 1969, Ser. No. 842,035
Int. Cl. E04h 17/14
U.S. Cl. 256—65
2 Claims

ABSTRACT OF THE DISCLOSURE

A telescoping post for handrail may be fixed at adjusted heighths by means of a friction member which passes through the hollow wall of the inner-telescoping member and bears against the inner wall of the outer member. The friction member is acted upon by means disposed in the hollow of the inner member; which means is fixed by a set screw.

CROSS-REFERENCE TO RELATED APPLICATION

This is a division of application Ser. No. 738,025 filed June 18, 1968, now Pat. No. 3,469,823 which is a continuation-in-part of application, Ser. No. 627,444, filed Mar. 31, 1967 now Pat. No. 3,441,253.

BACKGROUND OF THE INVENTION

This invention relates generally to handrail units and more particularly, to improvements in posts, and means for adjusting the height of posts.

SUMMARY OF THE INVENTION

An adjustable post having two telescoping members includes a hollow inner member with a friction element, slidably mounted in the wall thereof forming the hollow, and extending laterally through said wall to bear upon the inner wall of the outer telescoping member and hold the members in adjusted position upon application of a fixed force. Force is applied by a novel lever means having a screw passing through one end thereof.

Accordingly, an object of this invention is to provide a handrail unit wherein the post is sectional, and one section of the post is adjustably telescoped into the other and frictionally secured thereto by a concealed locking means.

Another object is to provide such a post wherein the means securing the post sections together is operable by means exposed to facilitate application of a tool.

These and other objects of the invention will become apparent from the following disclosure with reference to the drawings.

DESCRIPTION OF THE PREFERRED EMBODIMENTS

Figure 1:
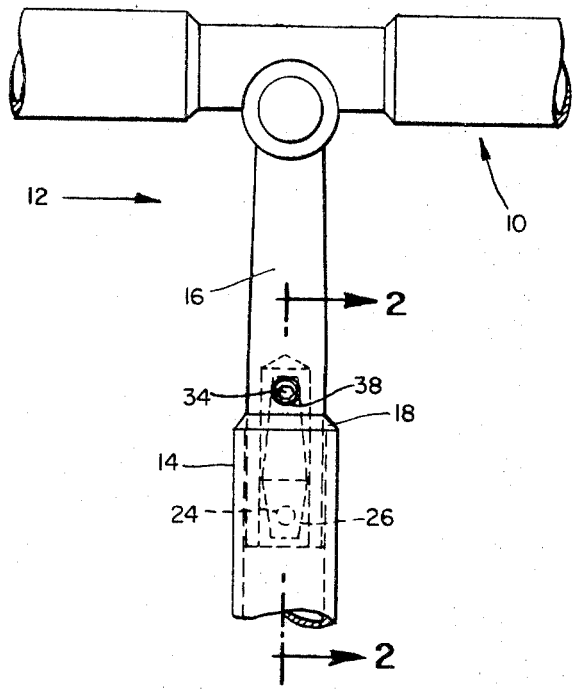
FIG. 1 is an elevation of handrail and post, constructed in accordance with the invention.

Although specific forms of the invention have been selected for illustration in the drawings, and the following description is drawn in specific terms for the purpose of describing these forms of the invention, this description is not intended to limit the scope of the invention which is defined in the appended claims.

Figure 2:
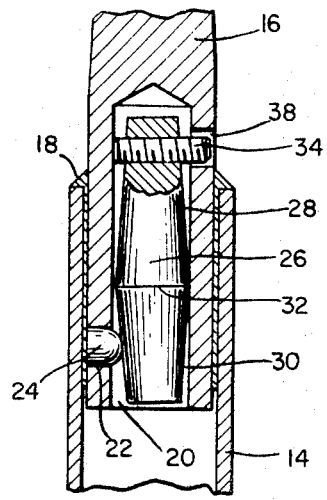
FIG. 2 is a section taken along the lines 2—2 in FIG. 1.

Referring to the drawings, the handrail, generally designated 10, may be of any suitable type, such as that shown in the copending applications referred to above and is affixed to a telescoping post generally designated 12 in any suitable fashion, such as that shown in the copending applications aforesaid. The basic post unit comprises at least two telescoping members, the outer member 14 is a relatively thin-walled tubular member which may be of any appropriate design or configuration and is constructed of aluminum or similar material, and cut to a standard length. The inner member 16 is disposed within the outer member and is of sufficient length that it may be adjusted within the acceptable limits of railing post adjustment, necessitated by variations which arise in installation of the railing unit. The length of the portion within the outer member is on the order of two to three inches. In accordance with one embodiment as shown in FIG. 2, a sleeve 18 is disposed in sliding engagement with the inner member and is in contact with the outer member. The sleeve is deformable, as more fully explained in the earlier filed copending application, to grip the walls of the outer member. Alternatively, as shown in FIG. 3, the inner member may be disposed in sliding engagement with the outer member, thereby obviating the need for a sleeve.

Referring to FIG. 2, the inner member 16 is centrally bored as at 20, and the wall forming the bore is provided with a hole 22 which accommodates a friction member 24 in sliding engagement therewith. The configuration of the member 24 is a matter of choice. However, it preferably presents a sharp surface or edge to the wall of the tubing 14 or the sleeve 18 upon which it is going to bear. The other end of the member 24 is preferably semi-spherical, and extends partially into the hollow 20. Inserted into the bore 20 is a double tapered cone or cat-shaped locking piece 26, circular in transverse section, opposite end portions of which, designated 28 and 30, are tapered down from an intermediate section 32. The intermediate section 32 can be disposed at various positions axially of the tapered locking piece 26, however, it is preferably disposed closer to the end of the locking piece bearing against the friction member 24 than it is to the other end, in order to provide a mechanical advantage. A set screw 34 extends through the end of the cat-shaped locking piece 26, and is in threaded engagement therewith. A clearance hole 38 is provided in the wall forming the hollow for insertion of a tool, to turn the set screw. As the set screw is advanced, it bears against the wall of the bore and tilts the locking piece 26 and causes the other end 30 thereof to bear upon the rounded end of the friction member 24 and force it outwardly against the sleeve 18 or the inner wall of the outer member 14. Where a sleeve is used the friction member 24 tends to deform and expand the wall of the sleeve, which in turn is pressed against the inner wall of the member 14, and thus the post sections are frictionally secured against relative axial shifting movement.

Figure 3:
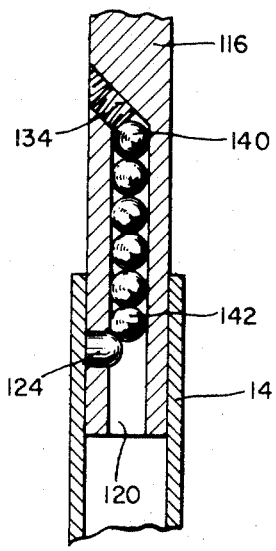
FIG. 3 is a section similar to FIG. 2 showing an alternate embodiment of my invention.

Referring to FIG. 3 an alternate embodiment of my invention is shown which is more fully described in my copending later filed application. Herein the downward force of the ball 142 forces the friction member 124 outwardly through the hole in the wall of the inner member, so that it bears against the inner wall of the outer member 14; thus once again, frictionally securing the telescoping post members in adjusted axial position against shifting movement. Reference is herein made to this embodiment to illustrate this alternate form of frictional coaction.

It is of particular advantage in both of these embodiments that the parts used for frictionally engaging and retaining the telescoping parts are preferably made of stainless steel so that when used with aluminum telescoping parts, the steel tends to deform the aluminum and provide a positive holding action. The advantage of the embodiment shown in FIG. 2 over that shown in my earlier filed copending application is that in the present embodiment, one steel part is threaded into another, while in the prior device, the set screw was threaded into the thin wall of the inner member. Thus, in the prior embodiment, all the force was directed against the relatively weak aluminum threads.

It will be understood that various changes in the details, materials and arrangement of parts which have been herein described and illustrated in order to explain the nature of this invention, may be made by those skilled in the art within the principle and scope of the invention as expressed in the following claims.

It will further be understood that the "Abstract of the Disclosure" set forth above is intended to provide a non-legal technical statement of the contents of the disclosure in compliance with the Rules of Practice of the United States Patent Office, and is not intended to limit the scope of the invention described and claimed herein.

What is claimed is:
1. In a handrail structure, a post comprising:
(a) an upper post section connected to the handrail and having a hollow formed therein in the lower end portion thereof;
(b) a lower post section having an upper end portion slidably fitted over said lower end portion; and
(c) means for frictionally locking together said upper and lower post sections comprising:
 (1) a friction member extending laterally through the wall forming said hollow in said lower end portion of said upper post section;
 (2) a locking piece circular in transverse section and tapered toward each end from a maximum diameter at a section intermediate the ends thereof disposed within said hollow to engage said friction member with the tapered portion of one end thereof and move it laterally upon being rocked;
 (3) a screw threaded through the other end of said locking piece to bear against the wall within said hollow and rock said locking piece.

2. The invention of claim 2 wherein a sleeve member is slidably fitted over the lower end portion of said upper post section and deformable in transverse section under the influence of pressure applied by said friction member.

References Cited
UNITED STATES PATENTS

| | | | |
|---|---|---|---|
| 1,611,912 | 12/1926 | Hleb | 287—53 |
| 1,840,048 | 1/1932 | Michelman | 256—65 X |
| 1,866,112 | 7/1932 | Kindelmann et al. | 287—53 |
| 1,926,798 | 9/1933 | Baumbach. | |
| 2,232,340 | 2/1941 | Olson. | |
| 2,822,986 | 2/1958 | Schreier | 85—53 X |
| 3,455,586 | 7/1969 | Kurtzmann | 287—53 X |

DENNIS L. TAYLOR, Primary Examiner

U.S. Cl. X.R.

256—70